United States Patent
Pai

(10) Patent No.: US 6,550,499 B1
(45) Date of Patent: Apr. 22, 2003

(54) DETECTABLE LIQUID LEAKAGE CONDUIT

(75) Inventor: Juin-Rong Pai, Jubei (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 10/071,719

(22) Filed: Feb. 8, 2002

(51) Int. Cl.$^7$ ................................................ F16L 55/00
(52) U.S. Cl. ...................... 138/104; 138/137; 138/121; 138/141
(58) Field of Search ................................ 138/137, 140, 138/141, 104, 121

(56) References Cited

U.S. PATENT DOCUMENTS

| | | | | |
|---|---|---|---|---|
| 4,478,252 A | * | 10/1984 | McLoughlin | 138/140 |
| 4,578,855 A | * | 4/1986 | Van Der Hagen | 138/109 |
| 4,800,109 A | * | 1/1989 | Washizu | 138/137 |
| 4,804,207 A | * | 2/1989 | Berchem et al. | 138/109 |
| 5,228,478 A | * | 7/1993 | Kleisle | 116/208 |
| 5,267,670 A | * | 12/1993 | Foster | 138/104 |
| 5,551,484 A | * | 9/1996 | Charboneau | 138/104 |
| 6,064,000 A | * | 5/2000 | Kim | 138/138 |
| 6,305,423 B1 | * | 10/2001 | De Meyer et al. | 138/104 |
| 6,305,427 B1 | * | 10/2001 | Priest, II | 138/104 |

* cited by examiner

*Primary Examiner*—Patrick Brinson
(74) *Attorney, Agent, or Firm*—Tung & Associates

(57) ABSTRACT

A detectable liquid leakage conduit characterized by a conduit fitted with a tube which is capable of preventing spillage of liquid from the conduit in the event of a leak. In one embodiment, a leak sensor interposed between the tube and the conduit is electrically connected to a leak detector, whereby leaked fluid in the tube triggers an alarm signal to the leak detector, which alerts personnel to the need for repairing or replacing the conduit.

12 Claims, 3 Drawing Sheets

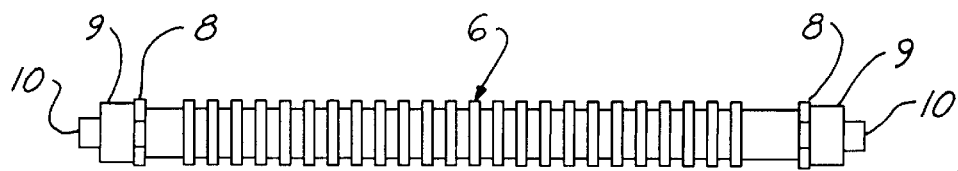
(Prior Art)
FIG. 1
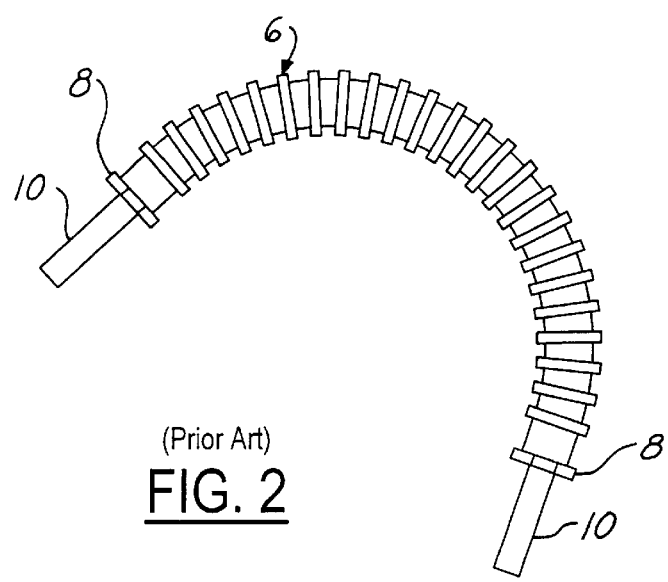
(Prior Art)
FIG. 2
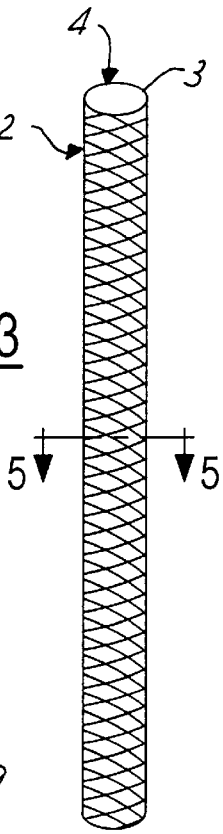
FIG. 3
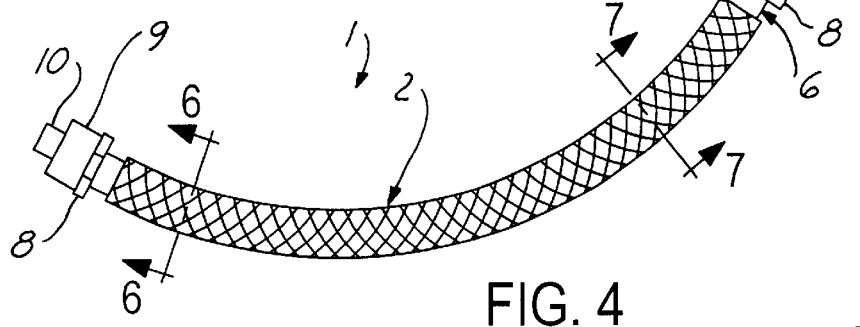
FIG. 4
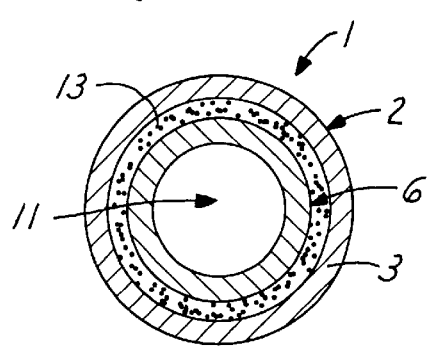
FIG. 6
FIG. 5

DETECTABLE LIQUID LEAKAGE CONDUIT

FIELD OF THE INVENTION

The present invention generally relates to a semiconductor processing furnace. More particularly, the invention relates to prevention of liquid spillage from pipes or conduits which convey processing or cooling liquids to semiconductor processing furnaces.

BACKGROUND OF THE INVENTION

Many processes and applications rely heavily on the use of liquids. Liquids are typically stored in tanks, such as reserving tanks, and are transported from such reserving tanks to process stations where they are required by way of piping lines.

It is desirable in any storage, transportation or process use of fluids for personnel to be aware of any tank or plumbing fluid leaks or breaches. Even minimal fluid leaks can be detrimental, not only from a material loss standpoint, but also from the standpoint of environmental and safety considerations if such fluids happen to be hazardous materials.

A variety of fluid leak detection schemes are known. For example, so-called differential pressure techniques may be used to detect the existence of leaks in a tank or piping. However, such techniques generally fail to identify localization of a leak and may have difficulty if not total inability to detect the existence of very small leaks. Furthermore, such techniques may experience significant time lag between when a leak first occurs and when the leak is detected, rendering such detection techniques undesirable in time-critical leak detection applications.

Piping and tank leaks may also be detected by way of discrete, uninsulated electrode pair placements wherein a fluid leak that causes the fluid to bridge the electrodes is detected as a short across the electrodes or as a significant change in the resistance between the electrodes. The fact that such a technique uses exposed or uninsulated electrodes may be problematic in applications using flammable fluids, as they represent a potential ignition source.

Certain other techniques have been proposed which utilize a coaxial conductor cable wherein the dielectric layer that is intermediate the solid central and braded exterior conductors is porous. Infiltration of the fluid from a leak to be detected into the porous intermediate layer causes a substantial change in the permittivity of the layer at the infiltrated location. Pulse reflection distortion techniques are then utilized to detect the presence and location of the leak. This proves to be a solution requiring expensive and sophisticated electronics for generating and interpreting signals. Furthermore, it is recognized that such techniques may be slow to detect leaks due to wicking effects of the braided outer layer which slows the infiltration of the leaked fluid through the porous intermediate layer and may distribute the liquid over an exceptionally long length of the cable.

Yet another option in fluid leak detection is disclosed in commonly assigned and co-pending U.S. patent application Ser. No. 09/881,389, In that application, a thermal sensing fluid leak detection scheme is described. Temperature changes in the detector due to fluid contact are detected in such a scheme. While the invention described therein is regarded as an improvement over the prior art, it may not meet all requirements of certain fluid leak detection applications. For example, a plurality of such individual thermal leak detection apparatus may be required to adequately canvas an area of interest for the purpose of leak detection. Even then, the granularity of localizing the source of such leaks may be greater than that desired in a particular application.

SUMMARY OF THE INVENTION

Therefore, it is one object of the present invention to prevent spillage of a fluid leaked from a conduit.

It is a further object of the present invention to prevent spillage of a fluid leaked from a conduit for at least a sufficient time to facilitate repair or replacement of the conduit.

It is a further object of the present invention to prevent spillage of a fluid leaked from a conduit and immediately detect such leakage of the fluid from the conduit.

It is a still further object of the present invention to prevent spillage of a fluid leaked from a conduit by providing an enclosure on the conduit, which enclosure may further be provided with a sensing element for detecting the leaked fluid and alerting personnel to the need for repair or replacement of the conduit.

In accordance with these and other objects and advantages, the present invention comprises an enclosure, sleeve or tubing which is fitted on a conduit and may be sealed at both ends thereof. In the event of fluid leakage from the conduit, the sealed enclosure, sleeve or tubing prevents spillage of the fluid into the environment of the conduit. A pair of sensor strips electrically connected to a leak detector may be provided between the conduit and the enclosure, sleeve or tubing such that fluid leaked from the conduit and confined by the enclosure, sleeve or tubing causes an electrical short between the sensor strips, whereby the conductivity or capacitance between the sensor strips triggers an alarm signal to the leak detector, which alerts personnel to the need for repairing or replacing the conduit.

BRIEF DESCRIPTION OF THE DRAWINGS

The present invention will now be described, by way of example, with reference to the accompanying drawings, in which:

FIG. 1 illustrates a multi-segmented bellows pipe which is one example of a conduit suitable for implementation of the present invention;

FIG. 2 illustrates the bellows pipe of FIG. 1 disposed in a curved or arcuate, functional configuration;

FIG. 3 is a perspective view of a tubing suitable for implementation of the present invention;

FIG. 4 illustrates one illustrative embodiment of a spill-resistant bellows pipe of the present invention;

FIG. 5 is a cross-sectional view, taken along section lines 5—5 in FIG. 3, of the tubing element of the spill-resistant bellows pipe;

FIG. 6 is a cross-sectional view, taken along section lines 6—6 in FIG. 4, of the spill-resistant bellows pipe of the present invention;

DESCRIPTION OF THE PREFERRED EMBODIMENTS

Figure 7:
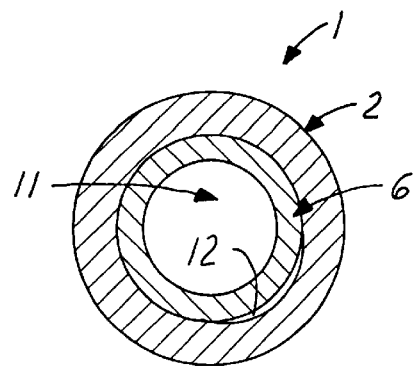
FIG. 7 is a cross-sectional view, taken along section lines 7—7 in FIG. 4, of the spill-resistant bellows pipe of the present invention.

When used herein, the term conduit shall be understood to mean any piping, plumbing, manifolding or the like generally used for the transportation, mixing or movement of liquid from one location to another. When used herein, the term tube shall be understood to mean any tube, sleeve or enclosure capable of circumferentially encircling or covering a conduit.

The present invention has particularly beneficial utility in application to preventing spillage of cooling water or process liquids from damaged or ruptured pipes which convey cooling water or process liquids from storage tanks to semiconductor furnaces in the semiconductor industry. However, the invention is not so limited in application and while references may be made to such semiconductor processing applications to illustrate the technology and benefits of such a system, the invention is more generally applicable to spillage prevention or spillage prevention and detection in a variety of industrial and product applications.

Advanced logic integrated circuits are fabricated using in excess of 300 fabrication steps. About 50 of those steps may involve some type of wet processing. Wet processing steps may generally be categorized into one of three areas: critical cleaning, critical etching and photoresist stripping. Conventional wet bench equipment may include fourteen or more storage tanks, a plurality of working tanks (e.g. reaction chambers, such as baths) wherein electronic component precursors (i.e. in process wafers) are exposed to various liquids, and a variety of plumbing conduits including valves, filters, recirculators and injection manifolds for the intermixing of a liquid carrier stream and various process liquids.

Many of the process liquids are hazardous. Integrity of the fluid system is therefore a major consideration for the integrated circuit manufacturer. When leaks do occur, it is imperative that they be detected and that the source of the leaks be located without delay. Process liquids are generally stored in tanks in a concentrated form and diluted to a usable concentration in an injection manifold. These process liquids include, without limitation, aqueous solutions of hydrochloric acid and buffers comprising the same, ammonium hydroxide and buffers comprising the same, hydrogen peroxide, sulfuric acid and buffers comprising the same, mixtures of sulfuric acid and ozone, hydrofluoric acid and buffers comprising the same, chromic acid and buffers comprising the same, phosphoric acid and buffers comprising the same, acetic acid and buffers comprising the same, nitric acid and buffers comprising the same, ammonium fluoride buffered hydrofluoric acid, solutions of sulfuric acid with ozone, sulfuric acid and ozone and/or hydrogen peroxide, inorganic acids such as sulfuric acid, nitric acid, chromic acid, and phosphoric acid, and hydrogen peroxide. Various drying fluids including alcohols such as methanol, ethanol, 1-propanol, isopropanol, n-butanol, secbutanol, tertbutanol, or tert-amyl alcohol, acetone, acetonitrile, hexafluoroacetone, nitromethane, acetic acid, propionic acid, ethylene glycol mono-methyl ether, difluoroethane, ethyl acetate, isopropyl acetate, 1,1,2-trichloro-1,2,2-trifluoroethane, 1,2-dichloroethane, trichloroethane, perfluoro-2-butyltetrahydrofuran, perfluoro-1,4-dimethylcyclohexane or combinations thereof may also be employed in a wet bench. No distinction is made herein between process liquids and drying liquids.

In addition to the conduits which convey the various process liquids to the injection manifold of a semiconductor processing furnace, cooling lines connected to the injection manifold facilitate circulation of cooling water through the manifold for cooling of the furnace. Such cooling lines typically include a system of conduits connected to a storage tank and a bellows pipe which is attached to the terminal conduit and bends in an arc to attach to the injection manifold. Because the knural, or bending, portion of the bellows pipe is the weakest portion of the pipe, that portion tends to corrode faster than other portions and therefore, is more vulnerable to cracks or rupture than any other segment of the conduit system.

Figure 8:
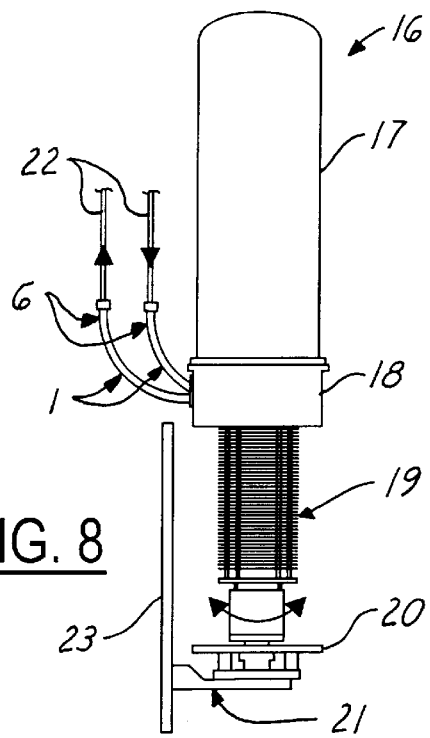
FIG. 8 illustrates a semiconductor processing furnace and boat elevator used in the processing of semiconductors, in addition to a pair of spill-resistant bellows pipes of the present invention connected to the injection manifold of the furnace.

According to the present invention, prevention of liquid spillage from a bellows pipe is exemplified in FIG. 8. While the invention as described has particular utility in preventing spillage of cooling water from a cracked or ruptured bellows pipe, it will be appreciated by those skilled in the art that the invention is equally applicable to bellows pipes or other conduits for the prevention of process or other liquids from spilling out of the conduit and into the surroundings or environment of the conduit. A typical conventional semiconductor processing furnace 16 is illustrated having a fluid injection manifold 18 to which is attached various conduits that convey semiconductor processing liquids to the furnace 16 for the heat-induced chemical processing of semiconductor wafers therein. Such chemical processing includes oxidation, diffusion, chemical vapor deposition and annealing. In order to realize elevated processing temperatures, semiconductor wafers are processed in an evacuated chamber, typically in a quartz tube which is housed in a heating body 17 provided on the manifold 18. A vertically-adjustable semiconductor wafer boat elevator 21 is coupled to a vertical spiral drive 23 which moves the elevator 21 up and down, beneath the furnace 16. Accordingly, multiple semiconductor wafers are loaded on the boat 19, which is raised and lowered with the wafer boat elevator 21 on the vertical spiral drive 23 for positioning of the semiconductor wafers in the semiconductor processing furnace 16 and removal of the semiconductor wafers from the semiconductor processing furnace 16.

A pair of cooling lines 22 is connected to the manifold 18 of the furnace 16, one for introduction of cooling water from a tank or other source (not illustrated) into the manifold 18 and the other for removal of the circulated cooling water from the manifold 18 in a continuous stream. As illustrated in FIG. 1, a pipe coupling 9 is provided on one end of a multi-segmented bellows pipe 6 for connection to the manifold 18, and a second pipe coupling 9 is provided on the opposite end of the bellows pipe 6 for connection to the remaining portion of the corresponding cooling line 22. Each bellows pipe 6 typically bends through an arc of about 90 degrees as it extends from the manifold 18 to the remainder of the cooling line 22, as illustrated in FIG. 8. One of the problems inherent in using a conventional, uncovered or unprotected bellows pipe 6 in a corrosive environment such as a semiconductor processing facility is that chlorine and other corrosive gases or chemicals tend to corrode the bellows pipe 6 and thus, eventually cause leakage of cooling water from the pipe bore 11 of the bellows pipe 6. The cooling water leaked from the bellows pipe 6 thus has a tendency to spill in the area beneath the furnace 16, and may spill on the semiconductor wafers on the wafer boat 19, thereby ruining the wafers.

An illustrative embodiment of a spill-resistant bellows pipe of the present invention is generally indicated by reference numeral 1 in FIGS. 3–7. The spill-resistant bellows pipe 1 includes a multi-segmented bellows pipe 6 traversed by a pipe bore 11, as illustrated in cross-section in FIG. 6, and pipe end flanges 8 adjacent to pipe couplings 9 are provided on respective ends of the bellows pipe 6. An elongated, typically cylindrical tube 2 has a tube wall 3 that may be constructed of heat-shrinkable cross-linked polyolefin for use in circumstances in which the liquid flowing through the bellows pipe 6 has a temperature of typically less than about 160° C. Under circumstances in which the liquid flowing through the bellows pipe 6 has a temperature of greater than about 160° C., the tube wall 3 of the tube 2 may be constructed of polytetrafluoroethylene, or Teflon®. The cylindrical tube wall 3 defines a tubing bore 4 which traverses the length of the tube 2. As illustrated in FIGS. 4–7, the knural, or multi-segmented bending portion, of the bellows pipe 6 extends through the tube bore 4 of the tube 2. As illustrated in FIG. 7, the tube wall 3 encircles the entire exterior circumference of the bellows pipe 6, and the tube 2 extends substantially the entire length of the knural portion of the bellows pipe 6.

In application, one of the pipe couplings 9 of the spill-resistant bellows pipe 1 is attached to a companion coupling (not illustrated) provided on the injection manifold 18 of the furnace 16, whereas the opposite pipe coupling 9 of the spill-resistant bellows pipe 1 is coupled to a companion pipe coupling (not illustrated) provided on the remaining portion of the cooling line 22. Accordingly, in the event that cracks or ruptures form in the bellows pipe 6 after prolonged usage, for example, any leakage of cooling water 12 from the bellows pipe 6 during cooling of the furnace 16 will tend to collect between the exterior surface of the bellows pipe 6 and the interior surface of the tube wall 3 in the tube bore 4, as illustrated in FIG. 7, instead of spilling or spraying out into the environment of the furnace 16. As illustrated in FIG. 6, glue or other adhesive 13 may be used to seal the respective ends of the tube 2 against the exterior surface of the bellows pipe 6, to further prevent spilling or spraying of water from between the bellows pipe 6 and the tube wall 3 and into the environment of the furnace 16. Furthermore, by preventing contact of chlorine or other corrosive gases or liquids with the bellows pipe 6, the tube 2 prevents or at least hinders corrosion and eventual leakage of the bellows pipe 6.

Figure 9:
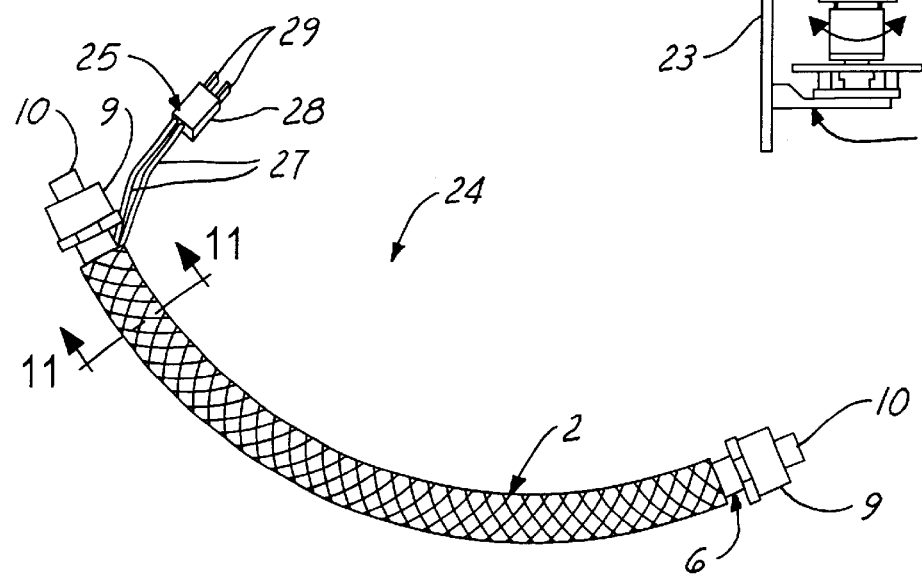
FIG. 9 illustrates a detectable liquid leakage bellows pipe of the present invention.
Figure 10:
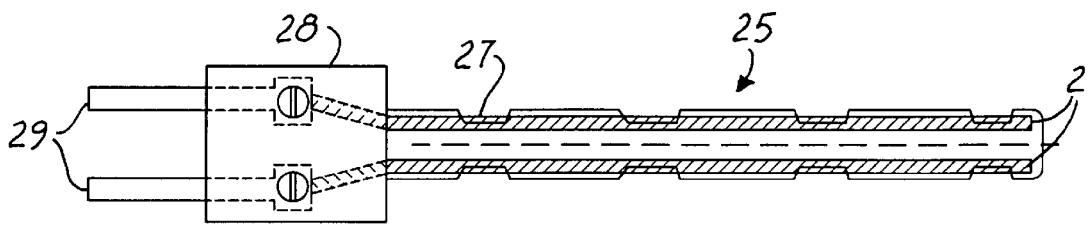
FIG. 10 illustrates a typical leak sensor suitable for implementation of the detectable liquid leakage bellows pipe of the present invention.
Figure 11:
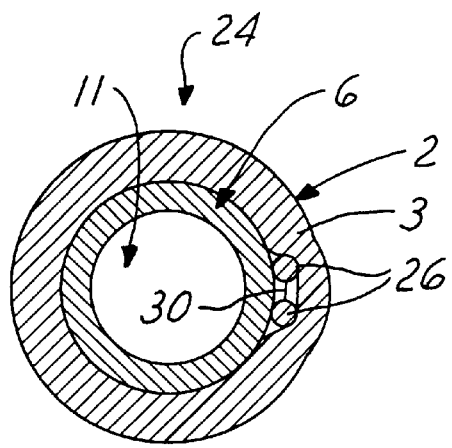
FIG. 11 is a cross-sectional view, taken along section lines 11—11 in FIG. 9, of the detectable liquid leakage bellows pipe.
Figure 12:
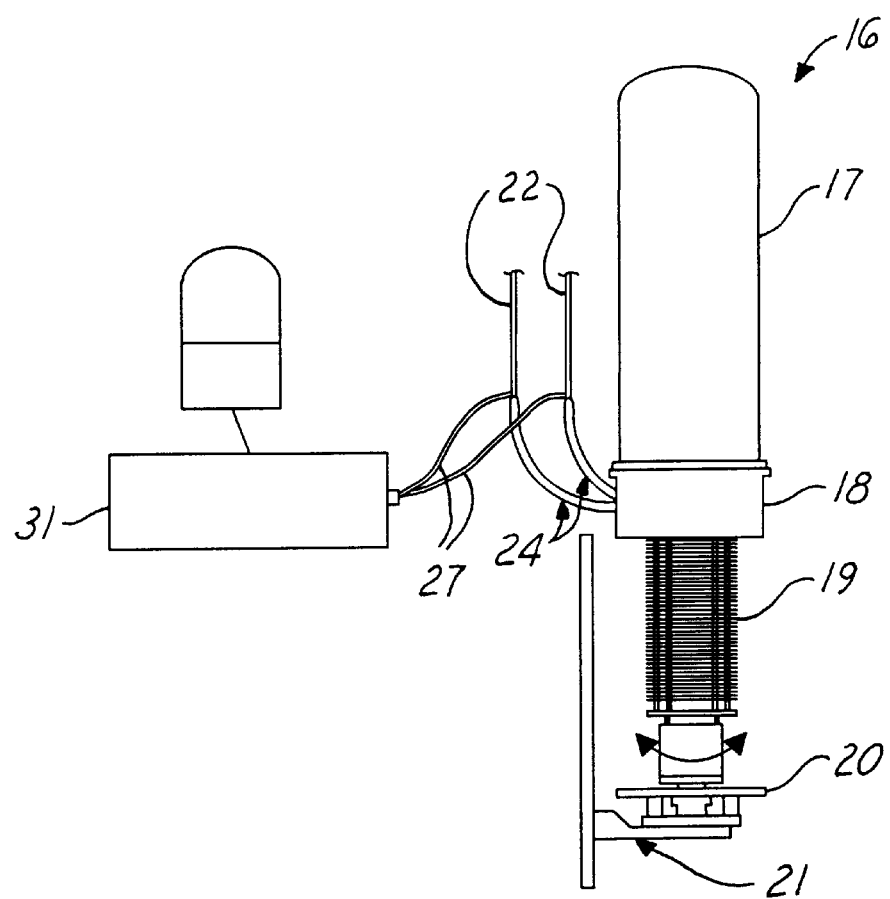
FIG. 12 illustrates a semiconductor processing furnace and boat elevator used in the processing of semiconductors, in addition to a pair of detectable liquid leakage bellows pipes of the present invention connecting respective cooling lines to the injection manifold of the furnace.

FIGS. 9, 11 and 12 illustrate a detectable liquid leakage bellows pipe of the present invention, generally indicated by reference numeral 24. The detectable liquid leakage bellows pipe 24 is fitted with a leak sensor 25, illustrated in FIG. 10, such as that sold by the Johnson-Matthey Co. of San Jose, Calif., and the leak sensor 25 is electrically connected to a leak detector 31 for detecting liquid leaks from the bellows pipe 6 as hereinafter described. As illustrated in FIG. 10, the leak sensor 25 includes a pair of elongated, parallel, spaced-apart metallic sensor strips 26, each of which is typically coated with a porous plastic. As illustrated in cross-section in FIG. 11, the sensor strips 26 are interposed between the exterior surface of the bellows pipe 6 and the tube wall 3 inside the tube bore 4 of the tube 2, and the sensor strips 26 extend the length of the tube 2. The sensor strips 26 are electrically connected to a plug 28 by means of connecting wiring 27, which extends from one end of the tube 2, between the tube wall 3 and the bellows pipe 6, as illustrated in FIG. 9. Parallel prongs 29 of the plug 28 are inserted in a socket (not illustrated) provided in a leak detector 31. Both ends of the flexible tubing 1 are covered with silica gel to reduce electrical conductivity between the tubing 1 and the bellows pipe 6. As heretofore described with respect to the spill-resistant bellows pipe 1 illustrated in FIG. 6, glue or other adhesive 13 may further be provided between the bellows pipe 6 and the tube wall 3 at respective ends of the tube 2 to prevent spillage of leaked water from the tube 2.

In typical application, a pair of the detectable liquid leakage bellows pipes 24 is used to connect the injection manifold 18 of a semiconductor process furnace 16 with the remaining portions of respective cooling lines 22, as shown in FIG. 12 and heretofore described with respect to the spill-resistant bellows pipe 1. As the plug 28 of the leak sensor 25 is plugged into the leak detector 31, a voltage differential is established between each pair of sensor strips 26. Accordingly, in the event that cooling water leaks from the pipe bore 11 of the bellows pipe 6 and into the tube 2, the water will bridge the parallel sensor strips 26 of the leak sensor 25, as indicated by the line 30 in the cross-sectional view of FIG. 11, and the bridging water effectively provides an electrical current path between the sensor strips 26. The resulting change in capacitance or established conductivity between the sensor strips 26 is relayed to the leak detector 31 through the connecting wiring 27 and plug 28, and the leak detector 31 immediately alerts personnel to the presence of a leak in the bellows pipe 6 and the need to repair or replace the bellows pipe 6. Simultaneously, the flexible tubing 1 prevents the fluid from spilling into the environment of the semiconductor furnace 16.

It will be recognized by those skilled in the art that the spill-resistant bellows pipe and the detectable liquid leakage bellows pipe of the present invention can be constructed with conduits of various design for conveying a variety of fluids not limited to cooling water, and are not limited to the multi-segmented bellows pipes described herein for illustrative purposes. It will be further recognized by those skilled in the art that any type of liquid sensor capable of detecting the presence of liquid between the tube and the bellows pipe or conduit may be utilized in conjunction with a leak detector for notifying personnel to the presence of a leakage in the bellows pipe or conduit.

While the preferred embodiments of the invention have been described above, it will be recognized and understood that various modifications can be made in the invention and the appended claims are intended to cover all such modifications which may fall within the spirit and scope of the invention.

Having described my invention with the particularity set above, I claim:

1. A detectable liquid leakage conduit comprising:
   a conduit;
   a tube encircling said conduit;
   a liquid leak sensor interposed between said conduit and said tube;
   adhesive provided between said conduit and said tube at respective ends of said tube, wherein said tube is capable of collecting fluid between said conduit and said tube; and
   a leak detector provided in electrical communication with said liquid leak sensor.

2. The detectable liquid leakage conduit of claim 1 wherein said tube comprises a heat-shrinkable cross-linked polyolefin tube.

3. The detectable liquid leakage conduit of claim 1 wherein said conduit comprises a multi-segmented bellows pipe.

4. The detectable liquid leakage conduit of claim 3 wherein said tube comprises a heat-shrinkable cross-linked polyolefin tube.

5. The detectable liquid leakage conduit of claim 1 wherein said tube comprises a polytetrafluoroethylene tube.

6. The detectable liquid leakage conduit of claim 5 wherein said conduit comprises a multi-segmented bellows pipe.

7. The detectable liquid leakage conduit of claim 1 further comprising a pair of conduit end flanges provided on said conduit.

8. The detectable liquid leakage conduit of claim 7 wherein said conduit comprises a multi-segmented bellows pipe.

9. The detectable liquid leakage conduit of claim 8 wherein said tube comprises a heat-shrinkable cross-linked polyolefin tube.

10. The detectable liquid leakage conduit of claim 8 wherein said tube comprises a polytetrafluoroethylene tube.

11. A spill-resistant conduit comprising:

a multi-segmented bellows pipe;

first and second pipe end flanges provided at respective ends of said pipe and first and second pipe couplings provided adjacent to said first and second pipe end flanges, respectively;

a heat-shrinkable cross-linked polyolefin tube encircling said bellows pipe; and adhesive provided between said pipe and said tube at respective ends of said tube, wherein said tube is capable of collecting fluid between said bellows pipe and said tube.

12. The spill-resistant conduit of claim 11 further comprising a liquid leak sensor between said pipe and said tube and a leak detector electrically connected to said liquid leak sensor to detect leakage of liquid from said pipe.

* * * * *